(12) United States Patent
Hazra et al.

(10) Patent No.: US 12,260,560 B1
(45) Date of Patent: Mar. 25, 2025

(54) EYE TRACKING BASED ON FUSING LENS-ALIGNED CAMERA AND LIGHT SENSOR DATA

(71) Applicant: Apple Inc., Cupertino, CA (US)

(72) Inventors: Siddharth S. Hazra, Hayward, CA (US); Aleksandar M. Movshovich, Santa Clara, CA (US); Nicholas C. Soldner, Mountain View, CA (US); Tushar Gupta, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 17/692,936

(22) Filed: Mar. 11, 2022

Related U.S. Application Data

(60) Provisional application No. 63/160,103, filed on Mar. 12, 2021.

(51) Int. Cl.
*G06T 7/20* (2017.01)
*G02B 27/00* (2006.01)
*G06V 10/80* (2022.01)

(52) U.S. Cl.
CPC ............ *G06T 7/20* (2013.01); *G02B 27/0093* (2013.01); *G06V 10/80* (2022.01)

(58) Field of Classification Search
None
See application file for complete search history.

(56) References Cited

U.S. PATENT DOCUMENTS

| | | | |
|---|---|---|---|
| 6,916,096 B2 * | 7/2005 | Eberl | G02B 21/0028 351/209 |
| 9,521,950 B2 | 12/2016 | Verdooner | |
| 9,661,215 B2 * | 5/2017 | Sivan | G06V 40/166 |
| 9,866,748 B2 * | 1/2018 | Sivan | H04N 23/75 |
| 10,687,703 B2 | 6/2020 | Berestka et al. | |
| 10,795,435 B2 | 10/2020 | Fontanel et al. | |
| 2002/0036750 A1 * | 3/2002 | Eberl | G02B 27/0093 351/207 |
| 2011/0176110 A1 * | 7/2011 | Bublizt | G02B 27/0093 351/210 |

(Continued)

OTHER PUBLICATIONS

Borsato, F.H. et al., "A Fast and Accurate Eye Tracker Using Stroboscopic Differential Lighting," 2015 IEEE International Conference on Computer Vision Workshop, IEEE, pp. 502-510, Dec. 2015 2015.

*Primary Examiner* — Anand P Bhatnagar

(74) *Attorney, Agent, or Firm* — Thompson Hine LLP

(57) ABSTRACT

Various implementations track an eye using both camera images and light sensor data, e.g., from a photosensitive surface or set of photodetectors. The camera need not capture images at a high capture rate since the light sensor data captured from the light sensor provides information about the eye during the time periods between camera frames. An eye tracking device may thus provide eye tracking with high temporal resolution using less power and resources and prior devices. The eye tracking device includes a lens (e.g., a diffractive optical element (DOE)) that splits received light onto the camera and light sensor. The camera and light sensor may be aligned, e.g., co-centered. Using such a lens to provide light to an aligned camera and light sensor facilitates tracking the eye characteristics by reducing the need for matching the data and/or accounting for multiple environmental light sources.

20 Claims, 4 Drawing Sheets

(56) References Cited

U.S. PATENT DOCUMENTS

| | | | |
|---|---|---|---|
| 2014/0009367 A1* | 1/2014 | Lvovskiy | F41G 3/225 |
| | | | 345/8 |
| 2015/0199006 A1 | 7/2015 | He et al. | |
| 2017/0237897 A1* | 8/2017 | Sivan | G06V 40/166 |
| | | | 348/47 |
| 2018/0068449 A1* | 3/2018 | Malaika | G06V 40/19 |
| 2019/0235248 A1 | 8/2019 | Ollila et al. | |
| 2019/0250704 A1 | 8/2019 | Price et al. | |
| 2020/0241308 A1 | 7/2020 | Danziger et al. | |
| 2020/0355929 A1 | 11/2020 | Zhang et al. | |
| 2021/0093193 A1 | 4/2021 | Birkner et al. | |
| 2021/0378509 A1 | 12/2021 | Nistico | |
| 2023/0367117 A1 | 11/2023 | Afek | |

\* cited by examiner

EYE TRACKING BASED ON FUSING LENS-ALIGNED CAMERA AND LIGHT SENSOR DATA

CROSS-REFERENCE TO RELATED APPLICATIONS

This application claims the benefit of U.S. Provisional Application Ser. No. 63/160,103 filed Mar. 12, 2021, which is incorporated herein in its entirety.

TECHNICAL FIELD

The present disclosure generally relates to assessing characteristics of eyes such as gaze directions, and in particular, to systems, methods, and devices for tracking an eye based on fusing camera and other light sensor data.

BACKGROUND

Some existing systems use light reflected off the surface of an eye to estimate eye characteristics. For example, camera images may be captured and used to identify multiple glint reflections on an eye surface to estimate eye shape, position, orientation, and/or gaze direction. Tracking eye characteristics with high temporal resolution requires capturing and processing images of the eye at a high frame rate, which, in turn, may impose significant power and resource requirements on an eye tracking system.

SUMMARY

Various implementations track an eye using both camera images and light sensor data, e.g., from a photosensitive surface or set of photodetectors. The camera need not capture images at a high capture rate since the light sensor data captured from the light sensor provides information about the eye during the time periods between camera frames. An eye tracking device may thus provide eye tracking with high temporal resolution using less power and resources and prior devices. The eye tracking device includes a lens (e.g., a diffractive optical element (DOE)) that splits received light onto the camera and light sensor. The camera and light sensor may be aligned, e.g., co-centered. Using such a lens to provide light to an aligned camera and light sensor facilitates tracking the eye characteristics by reducing the need for matching the data and/or accounting for multiple environmental light sources. The lens may be "flat" to minimize the size/form factor of the device.

Some implementations provide a device that includes a lens that directs a first portion of light to a camera and a second portion of the light to a light sensor. The exemplary device includes a camera comprising an image sensor configured to capture images at a first capture rate and a light sensor separate from the image sensor. The light sensor is configured to capture sensor data at a second capture rate that is faster than the first capture rate. The device includes a lens (e.g., a geometric phase lens or flat lens that uses polarization to redirect light in particular directions) positioned to direct a first portion of received light to the camera and a second portion of the received light to the light sensor. The device further includes a processor and a computer-readable storage medium comprising instructions that upon execution by the processor cause the device to track an eye based on (e.g., by fusing) the images captured by the camera and the sensor data captured by the light sensor. This may involve tracking the position of the eye at a higher frame rate than the camera's frame rate. The tracking may use a parameterized eye model-based approach or a machine learning (ML) based approach. The tracking may also use a behavioral model/information (e.g., vergence and accommodative models specific to the user based on the user's past eye behavior).

Some implementations provide a device that includes a lens that directs a first portion of light to a central area occupied by a camera and directs a second portion of the light to a peripheral area that is outside of the central area and occupied by a light sensor. The exemplary device includes a camera comprising an image sensor configured to capture images at a first capture rate and a light sensor separate from the image sensor. The image sensor and light sensor may operate independently and/or have separate readouts. The light sensor is configured to capture sensor data at a second capture rate that is faster than the first capture rate. The device includes a lens (e.g., a geometric phase lens or flat lens that uses polarization to redirect light in particular directions) that directs a first portion of received light to a central area occupied by the camera and directs a second portion of the received light to a peripheral area outside of the central area and occupied by the light sensor. The device further includes a processor and a computer-readable storage medium comprising instructions that upon execution by the processor cause the device to track an eye based on (e.g., by fusing) the images captured by the camera and the sensor data captured by the light sensor. This may involve tracking the position of the eye at a higher frame rate than the camera's frame rate. The tracking may use a parameterized eye model-based approach or a machine learning (ML) based approach. The tracking may also use a behavioral model/info (e.g., vergence and accommodative models specific to the user based on the user's past eye behavior).

Some implementations involve a method of tracking an eye characteristic based on images and sensor data that are aligned. For example, the method may involve receiving images captured by a camera at a first capture rate and receiving sensor data obtained via a light sensor separate from the image sensor. The light sensor is configured to capture the sensor data at a second capture rate that is faster than the first capture rate. A lens directs a first portion of received light to a central area occupied by the camera and directs a second portion of the received light to a peripheral area outside of the central area that is occupied by the light sensor such that the images and sensor data are co-centered. The method may involve a processor that executes instructions stored in a non-transitory computer-readable medium to track an eye based on the images and the sensor data. The eye may be tracked using a parameterized model of the eye or a machine learning model.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes:

one or more processors, a non-transitory memory, and means for performing or causing performance of any of the methods described herein.

BRIEF DESCRIPTION OF THE DRAWINGS

So that this disclosure can be understood by those of ordinary skill in the art, a more detailed description may be had by reference to aspects of illustrative implementations, some of which are shown in the accompanying drawings.

Figure 1:
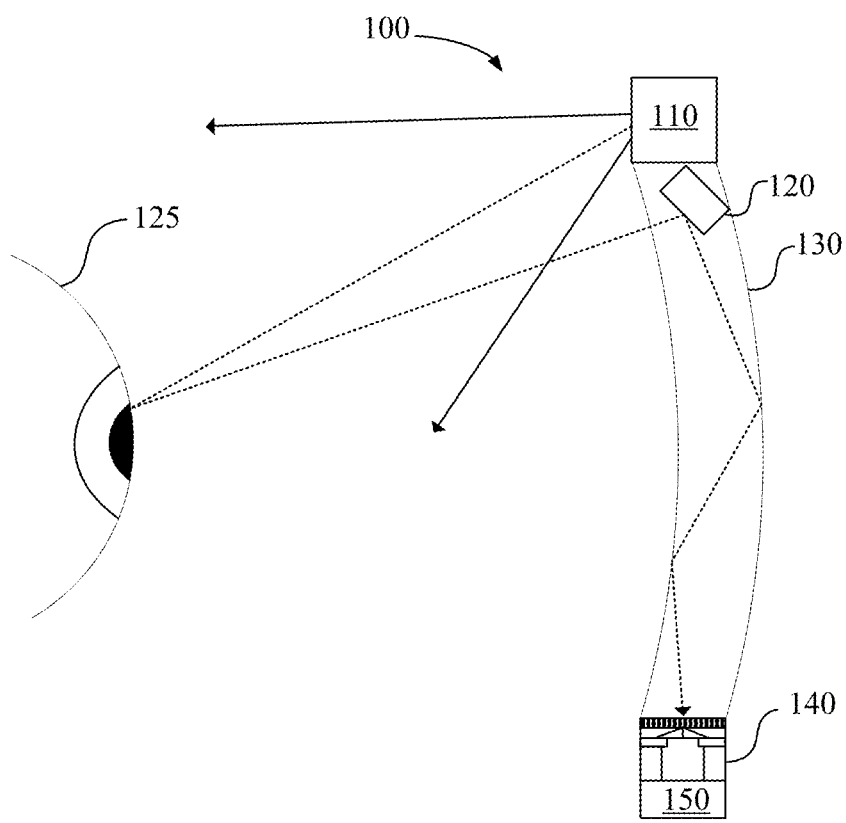
FIG. 1 illustrates an example device for tracking a user's eye using both camera images and light sensor data in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates a device 100 for tracking an eye 125 using both camera images and light sensor data. While pertinent features are shown, those of ordinary skill in the art will appreciate from the present disclosure that various other features have not been illustrated for the sake of brevity and so as not to obscure more pertinent aspects of the example implementations disclosed herein. The device 100 (e.g., an eye glasses device) includes an illuminator 110, a reflector 120, a glasses lens 130, and an eye imager 140.

The illuminator may be embedded within or attached to a housing or other portion of device 100. For example, if device 100 is an eye-glasses device, the illuminator may be embedded in a frame portion of the eye-glasses device. The illuminator 110 may be configured and positioned to illuminate eye 12 and or surrounding areas with light. The illuminator 110 may emit light towards the eye 125 of the user, which reflects in the form of one or more glints off the surface of the eye 125. The illuminator 110 may be configured to emit light in a near-infrared wavelength range (e.g., a wavelength range within the near-infrared spectrum of approximately 700-1400 nm). The illuminator may additionally be comprised of a plurality of additional illuminators that may be operated either synchronously or asynchronously.

Light (e.g., glints or other reflected light) is reflected by reflector 120 to be received by eye imager 140. In the example of FIG. 1, the reflector 120 directs light through glasses lens 130 to be received by the eye imager 140. In alternative implementations, light is received directly by eye imager 140 without being reflected or otherwise directed by another component such as reflector 120 and/or without being directed through glasses lens 130.

The eye imager 140 may include one or more cameras, sensors, and/or processing components that use the received light to track an eye characteristic of the eye 125. For example, the illuminator 110 may emit light onto the eye 125 that reflects as a light pattern (e.g., a circle of glints) that can be detected by a camera and light sensor of the eye imager 140. Based on the light pattern, a controller 150 of the eye imager 140 can determine an eye tracking characteristic. For example, the controller 150 can determine a gaze direction and/or a blinking state (eyes open or eyes closed) of the eye 125. As another example, the controller 150 can determine a pupil center, a pupil size, or a point of regard. Thus, in various implementations, the light is emitted by the illuminator 110, reflects off the eye 125, and is detected by the eye imager 140.

The eye imager 140 may be configured to detect light (i.e., reflections) corresponding to light emitted from the illuminator 110. For example, the illuminator 110 may be configured to produce light in a near-infrared wavelength range and the cameras and/or other light sensors of the eye imager 140 may be configured to capture light in the same (or similar) near-infrared wavelength range. The illuminator 110 may additionally emit light of specific polarization to increase SNR and mitigate ambient cross-talk. The illuminator 110 may additionally be temporally and spatially modulated to create intensity and directionally modulated signals.

The device 100 may be a head-mounted device, a wearable device, a hand-held device, or a device designed for other purposes for which eye tracking is appropriate. The device 100 may include components for displaying content to a user. For example, the device 100 may include a display (not shown) that displays an image, emitting light towards or onto the eye 125 or forming an image on glasses lens 130 that is visible to the eye 125. Accordingly, the device 100 may display content to the eye 125 and track the eye 125 while the eye 125 is viewing the content, e.g., tracking the gaze direction of the eye 125 and determining a portion of content being displayed that is being gazed upon based on the gaze direction.

In eye tracking and similar applications, it may be beneficial to have a fast and power-efficient light sensor (e.g., a photodetector circuit) working in conjunction with a traditional frame-based (i.e., shutter-based) camera module. Such frame-based cameras may thus be enabled to run at relatively lower acquisition rates, saving power while the less power-hungry light sensor elements provide data at a fast enough rate such that fused data from the two sources enable applications similar to that from an individual frame-based camera running at a higher rate. In other words, the combination of a camera and light sensor may enable high refresh rates using less power than prior techniques and devices.

Moreover, the separation of the light sensor (e.g., photodetector) and camera modules may make it difficult to correlate the optical data measured in the light sensor with data received by the frame camera. This lack of correlation may be overcome using combinations of computational models, complex calibration, and active illumination. In some implementations, a lens (e.g., a passive diffractive optical element) is used to integrate the light incident on a light sensor (e.g., a photodetector) with the light on a frame-based camera. The lens may also integrate optical power or band selective filters to specify light incident on the light sensor. Light sensors with higher sensitivities may be used to account for lenses (e.g., diffractive optical elements) having low optical transmission efficiencies.

Figure 2:
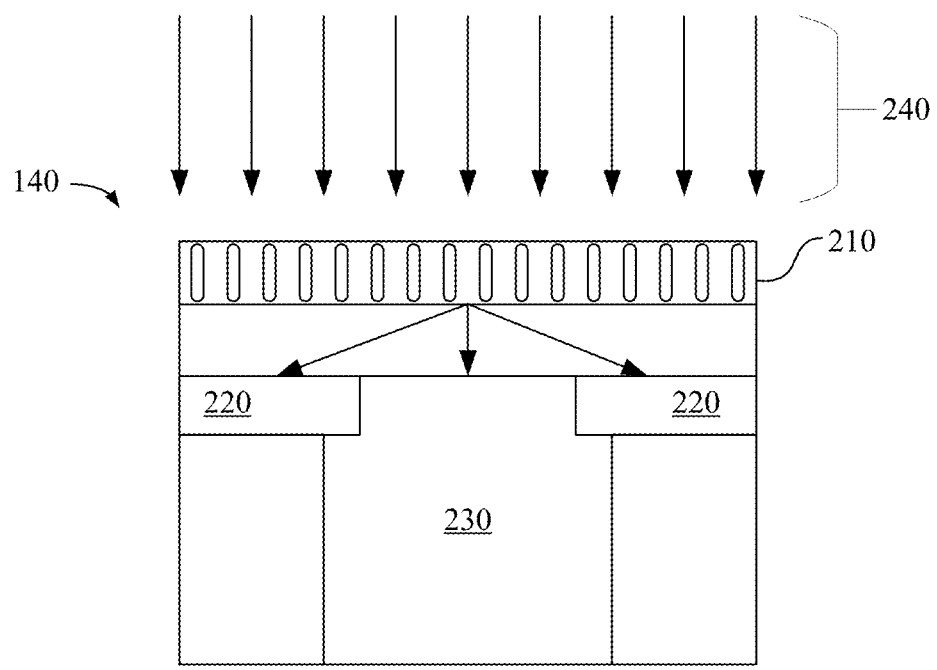
FIG. 2 illustrates the eye imager of the device of FIG. 1 in accordance with some implementations.

FIG. 2 illustrates the eye imager 140 of the device of FIG. 1. The eye imager 140 includes a lens 210, a camera 230, and a light sensor 220. The lens 210 may be a diffractive optical element, a geometric phase lens, or flat lens that uses polarization to redirect light in particular directions. The lens 210 is configured and positioned within the eye image 140 to distribute received light 240 to be received by both the camera 230 and the light sensor 220. The same light is thus provided to both the camera 230 and the light sensor 220. The lens may be "flat" to minimize the size/form factor of the eye imager 140. Due to the polarization sensitivity of the lenses, this also enables the lenses to only admit specific polarized light and can be used to mitigate the influence of unpolarized ambient light. This may further use the spatial and temporal modulation characteristic of the illuminator 110 to further enhance the signal collected at the eye imager.

The camera 230 is configured to capture images at a relatively slower rate than the light sensor 220 is configured to capture light sensor data. For example, the camera 230 may capture images at a rate of 30 frames per second and the light sensor 220 may capture light sensor data at a faster rate such that the light sensor data provides data for intermediate periods (i.e., between frames) of the camera's frame rate.

The light sensor 220 may include one or more light sensor components. For example, the light sensor 220 may include multiple photodetectors. The light sensor 220 may include one more light sensor components that are spatially arranged relative to the camera 230 and lens 210 such that the received light 140 is distributed to be received by both the camera 230 and the light sensor 220. The light sensor 220 may include one or more components that are distributed to facilitate analysis of relative differences in signals received in different directions. Such distribution may facilitate more accurate and/or efficient eye tracking using the camera and light sensor data.

The light sensor may include one more light sensor components that are spatially arranged to be aligned with the camera 230. For example, the light sensor 220 and camera 230 may be co-centered. Such alignment facilitates tracking the eye characteristics by reducing the need for aligning the data and/or accounting for multiple environmental light sources. In addition to light sensor placement relative to the camera sensor, light control films or lenslets which focus, polarize, direct or limit passband wavelengths can be uniquely applied to each light sensor element.

Figure 3:
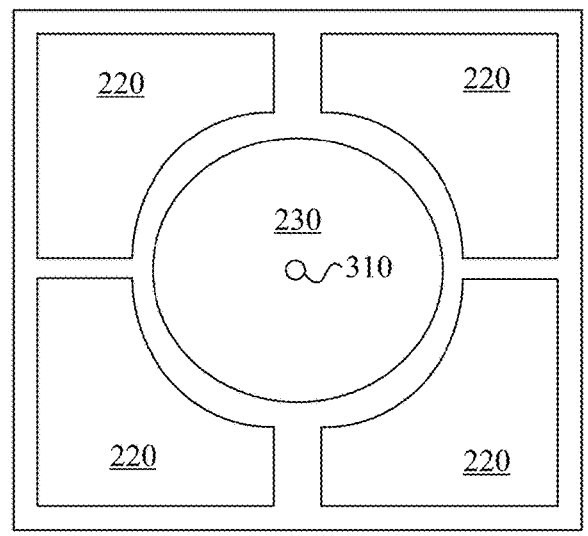
FIG. 3 is a cross-sectional view of the eye imager of FIG. 1 in accordance with some implementations.

FIG. 3 is a cross-sectional view of the eye imager 140 of FIG. 1. In this example, the camera 230 is centered at position 310 and the light sensor 220 includes four spatially-separated light sensor components that are also centered around the position 310. Thus, FIG. 3 illustrates an example camera/light sensor spatial arrangement such that the lens 210 (FIG. 2) will direct a first portion of received light 140 to a central area occupied by the camera 120 and direct a second portion of the received light 140 to a peripheral area outside of the central area and occupied by the light sensor 220. The camera 230 and light sensor 220 may operate independently and/or have separate readouts. Optionally this assembly may also include additional optical elements such as filters, light guides, directional or holographic diffusers.

Figure 4:
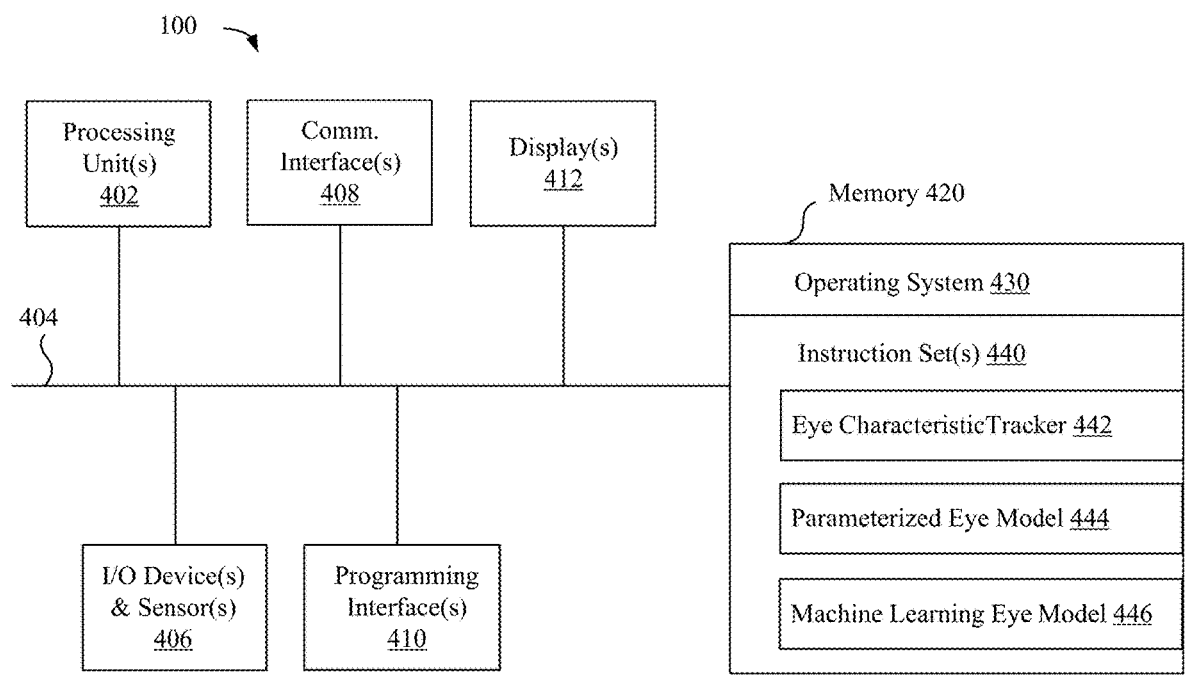
FIG. 4 is a block diagram of data acquisition and processing features of the device of FIG. 1 in accordance with some implementations.

FIG. 4 is a block diagram of data acquisition and processing features of the device 100 of FIG. 1. The device 100 may include software, firmware, and/or hardware. The device 100 may be configured to present an environment (e.g., augmented reality, virtual reality, etc.) to a user while the user is within the physical environment. The device 100 may enable optical see-through of the physical environment. The user may wear the device 100 as a head mounted device (HMD) on his or her head. The device 100 may be positioned within or enclose the field-of-view of the user. The device 100 may be a handheld device (e.g., a smartphone or a tablet).

The device 100 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 410, one or more displays 412, a memory 420, and one or more communication buses 404 for interconnecting these and various other components. The one or more communication buses 404 may include circuitry that interconnects and controls communications between components.

The one or more I/O devices and sensors 406 may include a camera, a light sensor, an inertial measurement unit (IMU), an accelerometer, a magnetometer, a gyroscope, a thermometer, a physiological sensor (e.g., blood pressure monitor, heart rate monitor, blood oxygen sensor, etc.), a microphone, a speaker, a haptics engine, a depth sensor (e.g., a structured light, a time-of-flight, or the like), and/or the like.

A camera may include one or more RGB cameras (e.g., with a complimentary metal-oxide-semiconductor (CMOS) image sensor or a charge-coupled device (CCD) image sensor), monochrome cameras, IR cameras, and/or the like. A camera may be a frame/shutter-based camera that, at a particular point in time or multiple points in time at a frame rate, generates an image, e.g., of the eye 125 of the user. Each image may include a matrix of pixel values corresponding to pixels of the image which correspond to locations of a matrix of light sensors of the camera.

The one or more I/O devices and sensors 406 may include other types of light sensors including, but not limited to photosensitive surface or photodetectors. As illustrated in FIGS. 2-3, such sensors may be spatially arranged in a peripheral region outside of a central region that is occupied may a camera, e.g., a frame/shutter-based camera.

The one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. The one or more displays 412 may correspond to diffractive, reflective, polarized, holographic, etc. waveguide displays.

The memory 420 includes high-speed random-access memory, such as DRAM, SRAM, DDR RAM, or other random-access solid-state memory devices. The memory 320 may include non-volatile memory, such as one or more magnetic disk storage devices, optical disk storage devices, flash memory devices, or other non-volatile solid-state storage devices. The memory 420 optionally includes one or more storage devices remotely located from the one or more processing units 302. The memory 420 comprises a non-transitory computer readable storage medium. The memory 420 or the non-transitory computer readable storage medium of the memory 320 may store the following programs, modules and data structures, or a subset thereof including an optional operating system 430 and instruction sets 440.

The operating system 430 includes procedures for handling various basic system services and for performing hardware dependent tasks. The instruction sets 440 may provide various function on device 100. To that end, in various implementations, the instruction sets 440 include an eye characteristic tracker 442, an eye model 444, and machine learning model 446.

The eye characteristic tracker 442 is configured to assess eye characteristics via one or more of the techniques disclosed herein. To that end, in various implementations, the eye characteristic tracker 442 includes instructions and/or logic therefor, configured neural networks, and heuristics and metadata therefor.

The parameterized eye model 444 is configured to model characteristics of an eye via one or more of the techniques disclosed herein. To that end, in various implementations, the eye model 444 includes instructions and/or logic therefor, configured neural networks, and heuristics and metadata therefor.

The machine learning eye model 446 is configured to model characteristics of an eye via one or more of the techniques disclosed herein. To that end, in various implementations, the eye model 446 includes instructions and/or logic therefor, configured neural networks, and heuristics and metadata therefor.

Although these elements are shown as residing on a single device (e.g., the device 100), it should be understood that in other implementations, any combination of the elements may be located in separate computing devices. Moreover, FIG. 4 is intended more as functional description of the various features which are present in a particular implementation as opposed to a structural schematic of the implementations described herein. As recognized by those of ordinary skill in the art, items shown separately could be combined and some items could be separated. For example, some functional modules shown separately could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5:
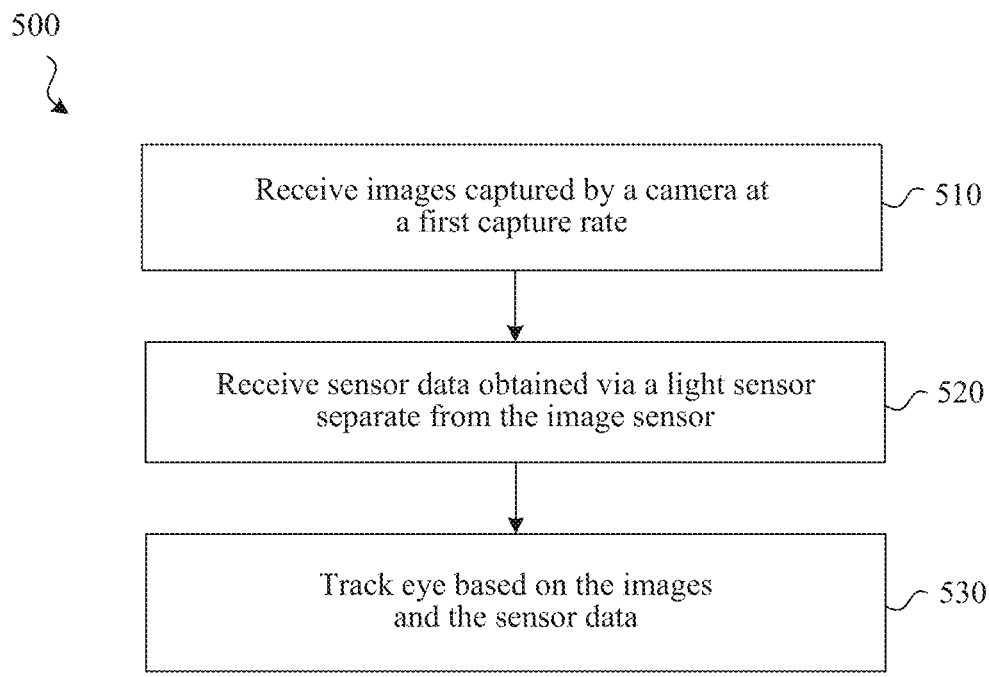
FIG. 5 is a flowchart representation of a method of tracking an eye characteristic in accordance with some implementations.

FIG. 5 is a flowchart representation of a method 500 of tracking an eye characteristic. The method may be performed by a device, such as a mobile device, desktop, laptop, or server device. The method can be performed on a head-mounted display (HMD). The method may be performed by processing logic, including hardware, firmware, software, or a combination thereof. The method may be performed by a processor executing code stored in a non-transitory computer-readable medium (e.g., a memory).

At block 510, the method 500 receives images captured by a camera at a first capture rate. The images may each comprise a matrix of pixel values representing light detected by pixel of an image sensor of the camera. The images may correspond to light reflected off the surface of an eye. The images may correspond to light generated by an illuminator that is reflected off the surface of the eye. The images may correspond to a particular wavelength of light, e.g., near IR light.

At block 520, the method 500 receives sensor data obtained via a light sensor (e.g., an array of spatially-segmented photodetectors) separate from the camera. The camera and light sensor may operate independently and/or have separate readouts. The light sensor is configured to capture the sensor data at a second capture rate that is faster than the first capture rate. A lens directs a first portion of received light to a central area occupied by the camera and directs a second portion of the received light to a peripheral area outside of the central area that is occupied by the light sensor. Accordingly, the images and sensor data are co-centered. Co-centric measurements enable a simpler calibration scheme that is required to separate optical influences that result from ambient IR illumination.

At block 530, the method tracks the eye based on the images and the sensor data. The eye characteristic may tracked at a faster rate than the first capture rate of the camera. The sensor data may be used to interpolate eye characteristics between high precision states of the frames of the camera images. In some implementations, the images and sensor data are fused on an on-going bases as new (e.g., live) camera and sensor data are received. The eye may be tracked using a parameterized model of the eye or a machine learning model.

In some implementations, the method 500 tracks gaze direction. A pupil center may be determined based on a pupil characteristic assessment and used as part of a gaze direction determination that determines gaze direction based on pupil center, cornea center, eyeball center, etc. A gaze direction may be determined based on an ellipse corresponding to a shape of a pupil. Additional information about the eye may be used to determine the gaze direction.

Gaze direction can be used for numerous purposes. In one example, gaze direction is used to identify a virtual or real item, e.g., to identify what physical object, user interface button, image, text, or other item a user is looking at. In another example, gaze is used to display a movement of a graphical indicator (e.g., a cursor or other user-controlled icon). In another example, gaze is used to provide input. For example, a particular gaze movement pattern can be recognized and interpreted as a particular command.

Gaze tracking may be performed on two eyes of a same individual concurrently. In implementations in which images of both eyes are captured or derived, the system may determine or produce output useful in determining a convergence point of gaze directions from the two eyes. The system could additionally or alternatively be configured to account for extraordinary circumstances such as optical axes that do not align.

In some implementations, post-processing of gaze direction is employed. Noise in the tracked gaze direction can be reduced using filtering and prediction methods, for example, using a Kalman filter. These methods can also be used for interpolation/extrapolation of the gaze direction over time. For example, the methods can be used if the state of the gaze direction is required at a timestamp different from the recorded states.

In some implementations, camera and/or sensor data is used to update a model of an eye. For example, light sensor data may be input to a model that determines where the eye is gazing and/or the state of the muscles of the eye. Certain muscle states may be associated with certain gaze directions. Moreover, over time patterns of muscle behavior may be used to predict future muscle behavior and thus predict future gaze directions. Image and light sensor data about an eye may be used to determine eye rotations and other measurements and those rotations and measurements may be decomposed into to values for the stiffness and behavior of eye muscles using an oculomotor eye model.

Figure 6:
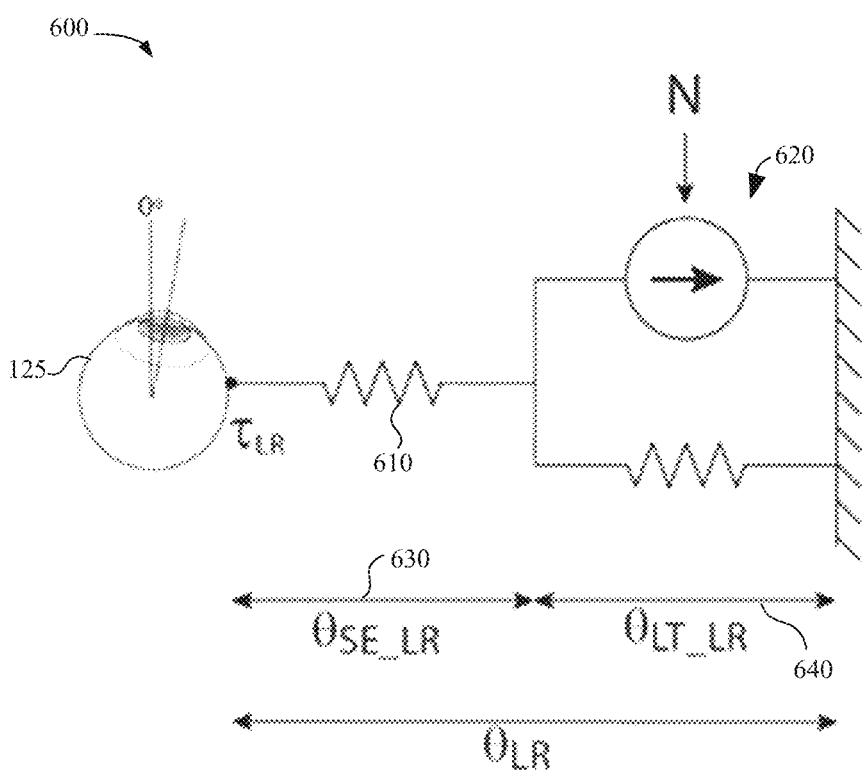
FIG. 6 illustrates a parameterized model of an eye according to some implementations.
Figure 7:
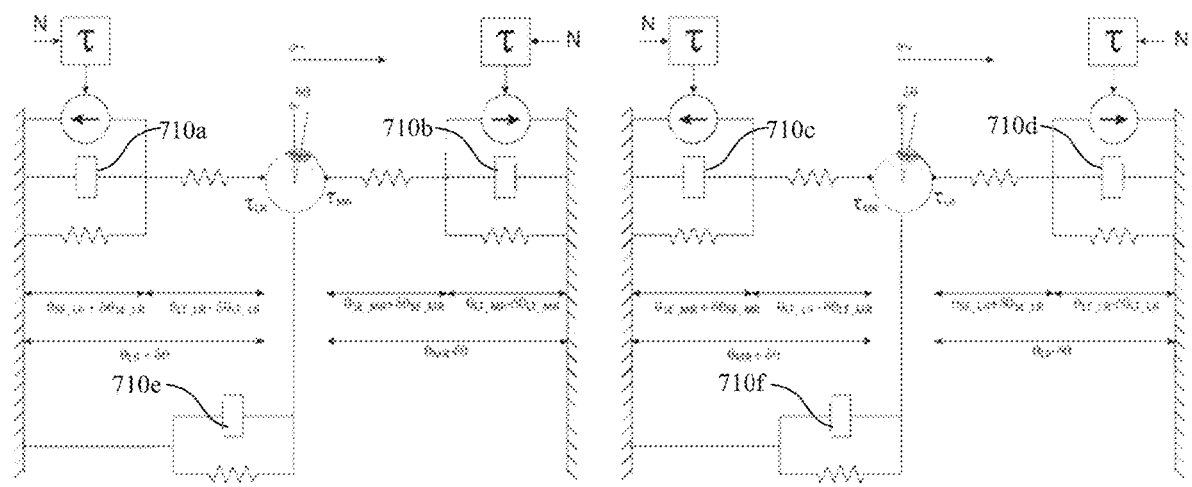
FIG. 7 illustrates another parameterized model of an eye according to some implementations.

Thus, in some implementations, the eye is tracked based on a parameterized oculomotor model of the eye. FIGS. 6-7 illustrate parameterized oculomotor eye models 600, 700. Camera images and light sensor data may be used to set the parameters (e.g., coefficients) of such a model and thus predict the eye characteristics represented thereby.

The eye rotates in its socket through the use of six muscles. The medial recti (MR) and lateral recti (LR) are mainly responsible for horizontal eye movements. The superior recti (SR) and inferior recti (IR) are mainly responsible for vertical eye movements. The superior oblique (SO) and inferior oblique (IO) are mainly responsible for eye rotations around the eye's primary axis of sight and vertical eye movements.

Model 600 models the biomechanics of the lateral recti (LR) of the eye 125 by modeling rotations of the eye 125 in plane. The rotation θ is attached to a series elastic (SE) element 610 that is stimulated by a neuronal activation function 620. The neuronal activation function 620 models an impulse that gets transmitted to the eye 125. $\theta_{SE\_LR}$ 640 and $\theta_{LT\_LR}$ 650 represent the possible deformations of the lateral recti (LR) muscle as modeled by the series elastic and length tension elements (with respect to the ocular socket that is considered fixed). Model 700 accounts for the dual-muscle characteristic of the eye and permits the tracking of the eye about the horizontal axes. Additional similar models may be used to enable tracking of the eye about the vertical axes, for torsional movements of the eye and dialatory pupil movements as well. It additionally shows a viscous element 710*a-f* that is used for modeling the damped response of ocular muscles.

The neuronal activation function is used to simulate the pulse characteristics of control signals from the brain. These neuronal control signals are used to compute the dynamical behavior of the muscle groups. The oculomotor plant enables the modeling of passive elasticity, tensioning, length tensioning, series elasticity and force velocity responses of oculomotor muscles. This consequently allows the estimation of the time-displacement behavior of the eye based on prior and current measurements of the state of the eye.

In some implementations, eye rotations are tracked based on camera images and light sensor data and used to calculate the coefficients of a parameterized oculomotor model of the eye 125. The model may be used to provide a state space description of the eye. For example, a transformation matrix may be developed and used to make predictions. For example, given a particular state, a transformation matrix may be used to predict velocities and/actuations that would be expected according to the oculomotor model of the eye. Based on observed motion, future motion of the eye may be predicted. In some implementations, camera and/or light sensor data are used to determined coefficients of a model and the model is used to interpolate eye characteristics during an intermediate time between frames of camera images based on the light sensor data received during that time. For example, once the eye finishes blinking, the model may predict a natural fixation in a particular direction. The light sensors may detect a blink during an intermediate period, and the system may determine an expected eye movement based on the modeled eye behavior.

The eye may additionally or alternatively be tracked using a vergence or accommodation model specific to the eye. Such models may be based on a previously-tracked behavior of the eye. The model may learn and thus be used to predict what the eye 125 typically does when trying to inspect a scene. In some implementations, information from one eye is used to predict what the other eye is doing based on a model that accounts for correspondences between the behaviors of the user's two eyes.

In some implementations, camera and/or sensor data are used to as input to a machine learning model that is trained to output a gaze direction. The machine learning model may include models that use neural networks, decision trees, linear regression, support vector machines, and the like. A machine learning model may be trained based on training data, e.g., ground truth data, that identifies the eye characteristic for a given set of training inputs. For example, gaze direction may be manually labelled by a training user following a displayed item on a display and deriving the gaze direction corresponding to the displayed location of the item over time. A machine learning model may utilize image and light sensor data corresponding to multiple states of a system (e.g., each of the last 5 images and all light sensor data received during that time period) to predict an eye characteristic for the current state and/or for one or more future states of the system.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A device comprising:
   a camera comprising an image sensor configured to capture images at a first capture rate, wherein a center of the camera is at a center position of a cross section of the camera;
   a light sensor separate from the image sensor, the light sensor configured to capture sensor data at a second capture rate, the second capture rate faster than the first capture rate, wherein the light sensor comprises one or more light sensor components in an arrangement centered around the center position such that the light sensor and camera are co-centered around the center position;
   a lens positioned to direct a first portion of received light to the camera and a second portion of the received light to the light sensor;
   a processor; and
   a computer-readable storage medium comprising instructions that upon execution by the processor cause the device to track an eye based on the images captured by the camera and the sensor data captured by the light sensor.

2. The device of claim 1, wherein the camera and light sensor are co-centered around the center position.

3. The device of claim 2, wherein the images and sensor data are aligned with respect to the center position.

4. The device of claim 2, wherein the lens:
   directs the first portion of the received light to a central area comprising the center position and a surrounding area, the central area occupied by the camera; and
   directs the second portion of the received light to a peripheral area outside of the central area, the peripheral area occupied by the light sensor.

5. The device of claim 1, wherein the lens is a diffractive optical element, a geometric phase lens, or a flat lens configured to redirect the received light in multiple directions.

6. The device of claim 1, wherein the light sensor comprises a plurality of photodetectors.

7. The device of claim 6, wherein the plurality of photodetectors comprise an array of spatially-segmented photodetectors.

8. The device of claim 1, wherein the position of the eye is tracked at a higher frame rate than the first capture rate.

9. The device of claim 1, wherein the position of the eye is tracked using a parameterized model of the eye or a machine learning model.

10. The device of claim 1, wherein the position of the eye is tracked using a vergence or accommodation model specific to the eye, wherein the vergence or accommodation model is based on a previously-tracked behavior of the eye.

11. The device of claim 1, wherein the image sensor and light sensor operate independently.

12. The device of claim 1, wherein the image sensor and the light sensor have separate readouts.

13. A device comprising:
    a camera comprising an image sensor configured to capture images at a first capture rate, wherein a center of the camera is at a center position of a cross section of the camera;
    a light sensor separate from the image sensor, the light sensor configured to capture sensor data at a second capture rate, the second capture rate faster than the first capture rate, wherein the light sensor comprises one or more light sensor components in an arrangement centered around the center position such that the light sensor and camera are co-centered around the center position;

a lens that directs a first portion of received light to a central area occupied by the camera and directs a second portion of the received light to a peripheral area outside of the central area and occupied by the light sensor;

a processor; and a computer-readable storage medium comprising instructions that upon execution by a processor cause the device to track an eye based on the images captured by the camera and the sensor data captured by the light sensor.

14. The device of claim 13, wherein the camera and light sensor are co-centered around the center position within the central area.

15. The device of claim 13, wherein the images and sensor data are aligned with respect to the center position.

16. The device of claim 13, wherein the lens is a diffractive optical element, a geometric phase lens, or a flat lens configured to redirect the received light in multiple directions.

17. The device of claim 13, wherein the light sensor comprises a plurality of photodetectors.

18. The device of claim 13, wherein the position of the eye is tracked at a higher frame rate than the first capture rate.

19. The device of claim 13, wherein the image sensor and light sensor operate independently.

20. A method comprising:

at a processor;

receiving images captured by a camera at a first capture rate, wherein a center of the camera is at a center position of a cross section of the camera;

receiving sensor data obtained via a light sensor separate from the camera, the light sensor configured to capture the sensor data at a second capture rate, the second capture rate faster than the first capture rate, wherein the light sensor comprises one or more light sensor components in an arrangement centered around the center position such that the light sensor and camera are co-centered around the center position, wherein a lens directs a first portion of received light to a central area occupied by the camera and directs a second portion of the received light to a peripheral area outside of the central area that is occupied by the light sensor such that the images and sensor data are co-centered; and tracking an eye based on the images and the sensor data, wherein the eye is tracked using a parameterized model of the eye or a machine learning model.

* * * * *

UNITED STATES PATENT AND TRADEMARK OFFICE
CERTIFICATE OF CORRECTION

| | |
|---|---|
| PATENT NO. | : 12,260,560 B1 |
| APPLICATION NO. | : 17/692936 |
| DATED | : March 25, 2025 |
| INVENTOR(S) | : Siddharth S. Hazra et al. |

Page 1 of 1

It is certified that error appears in the above-identified patent and that said Letters Patent is hereby corrected as shown below:

On the Title Page

ABSTRACT, Item (57), Line 9 reads:
"...resources and prior devices..."
Should read:
--...resources than prior devices...--

Signed and Sealed this
Twenty-second Day of April, 2025

Coke Morgan Stewart
*Acting Director of the United States Patent and Trademark Office*